(12) United States Patent
Bora

(10) Patent No.: US 10,410,310 B2
(45) Date of Patent: Sep. 10, 2019

(54) INTEGRATED BUILDING EVACUATION SYSTEM

(71) Applicant: Otis Elevator Company, Farmington, CT (US)

(72) Inventor: Geeta Bora, Hyderabad TS (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 212 days.

(21) Appl. No.: 15/315,061

(22) PCT Filed: Jun. 3, 2015

(86) PCT No.: PCT/US2015/033895
§ 371 (c)(1),
(2) Date: Nov. 30, 2016

(87) PCT Pub. No.: WO2015/187775
PCT Pub. Date: Dec. 10, 2015

(65) Prior Publication Data
US 2017/0103491 A1 Apr. 13, 2017

(30) Foreign Application Priority Data
Jun. 3, 2014 (IN) .......................... 1471/DEL/2014

(51) Int. Cl.
*G06Q 10/04* (2012.01)
*G06Q 90/00* (2006.01)
(Continued)

(52) U.S. Cl.
CPC ............ *G06Q 90/205* (2013.01); *A62B 5/00* (2013.01); *G05B 19/042* (2013.01);
(Continued)

(58) Field of Classification Search
None
See application file for complete search history.

(56) References Cited

U.S. PATENT DOCUMENTS 5,979,607 A 11/1999 Allen
2007/0016331 A1* 1/2007 Fehr ...................... G05B 15/02
700/275
(Continued)

FOREIGN PATENT DOCUMENTS

EP 0776856 A2 6/1997

OTHER PUBLICATIONS

International Search Report for application PCT/US2015/033895, dated Aug. 24, 2015, 11 pages.

*Primary Examiner* — Tuan C Dao
(74) *Attorney, Agent, or Firm* — Cantor Colburn LLP

(57) ABSTRACT

An integrated building evacuation system includes an evacuation controller; a fire alarm system in communication with the evacuation controller; an HVAC system in communication with the evacuation controller; a security system in communication with the evacuation controller; an elevator system in communication with the evacuation controller; and an output device in communication with the evacuation controller; the evacuation controller receiving data from the fire alarm system, the HVAC system, the security system and the elevator system to generate an evacuation path, during an evacuation event, for occupants of a building in response to the data from the fire alarm system, HVAC system, security system and elevator system, the evacuation controller providing the evacuation path to the output device.

12 Claims, 1 Drawing Sheet

(51) Int. Cl.
*G06Q 50/26* (2012.01)
*A62B 5/00* (2006.01)
*G05B 19/042* (2006.01)
*G08B 25/00* (2006.01)
*G08B 7/06* (2006.01)

(52) U.S. Cl.
CPC ......... *G06Q 10/047* (2013.01); *G06Q 50/265* (2013.01); *G05B 2219/25011* (2013.01); *G08B 7/066* (2013.01); *G08B 25/006* (2013.01)

(56) References Cited

U.S. PATENT DOCUMENTS

| | | | |
|---|---|---|---|
| 2007/0171049 A1* | 7/2007 | Argasinski | G08B 13/19656 340/539.13 |
| 2007/0194922 A1 | 8/2007 | Nathan et al. | |
| 2007/0272497 A1* | 11/2007 | Kawai | B66B 5/021 187/393 |
| 2007/0279210 A1 | 12/2007 | Li et al. | |
| 2007/0285510 A1* | 12/2007 | Lipton | G08B 13/1961 348/135 |
| 2008/0055077 A1* | 3/2008 | Lane | G08B 3/10 340/540 |
| 2008/0071396 A1* | 3/2008 | Quandel | G06Q 10/00 700/49 |
| 2010/0164732 A1 | 7/2010 | Wedig et al. | |
| 2011/0128159 A1* | 6/2011 | Hikita | B66B 5/021 340/815.4 |
| 2012/0047083 A1* | 2/2012 | Qiao | A62C 99/009 705/325 |
| 2012/0232968 A1* | 9/2012 | Calman | G06Q 30/0207 705/14.4 |
| 2013/0173062 A1* | 7/2013 | Koenig-Richardson | G06Q 10/00 700/275 |
| 2013/0245836 A1* | 9/2013 | Goodfellow | F24F 11/0001 700/276 |
| 2014/0003586 A1* | 1/2014 | Agrawal | G08B 3/10 379/37 |
| 2015/0096352 A1* | 4/2015 | Peterson | F24F 11/30 73/31.02 |

* cited by examiner

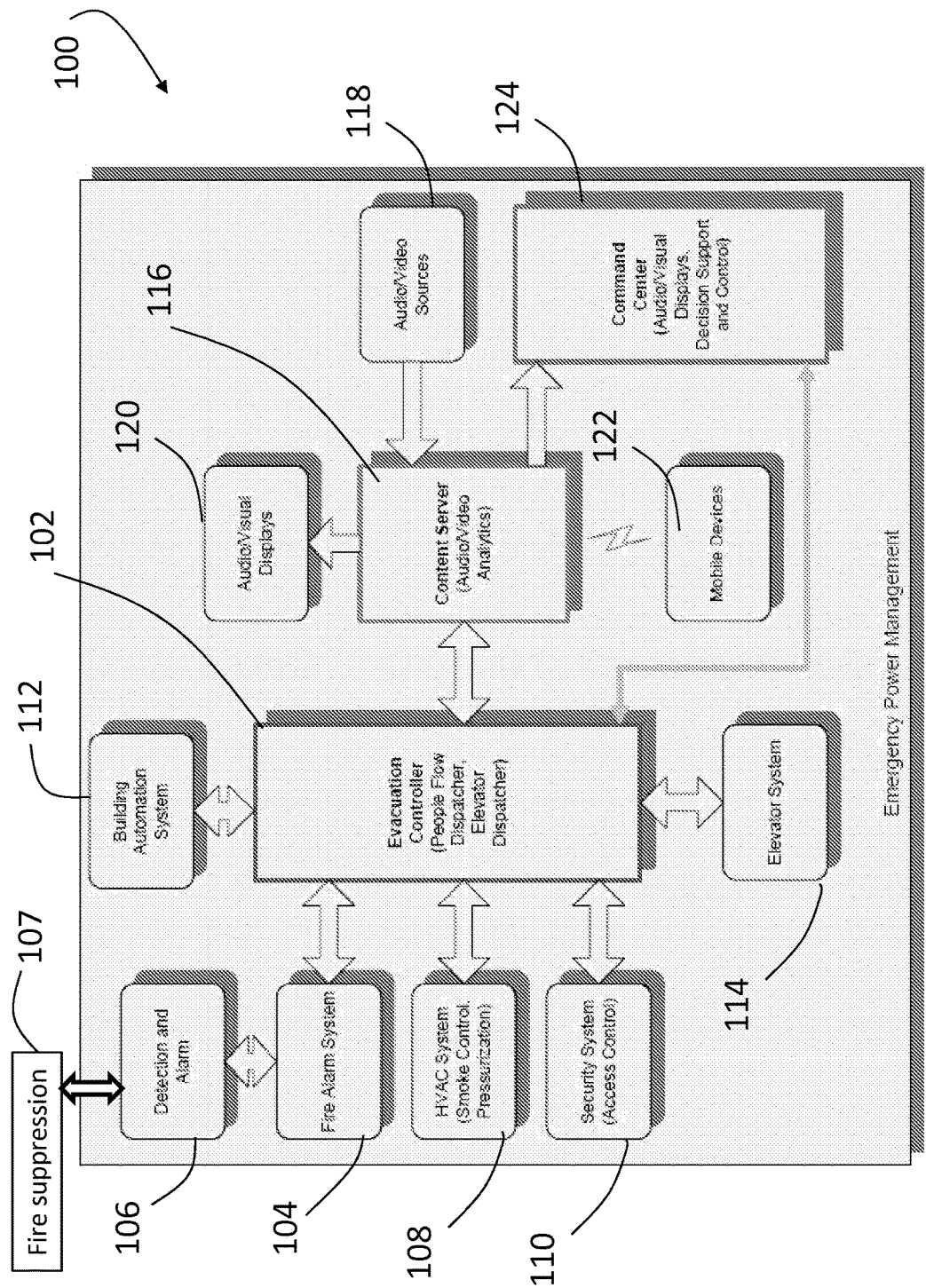

INTEGRATED BUILDING EVACUATION SYSTEM

TECHNICAL FIELD

The present disclosure relates generally to building evacuation during emergency events. More particularly, the present disclosure relates to an integrated system for evacuation of a building. The present disclosure provides interoperation of various intelligent systems for efficient evacuation of buildings, such as tall buildings.

BACKGROUND

High-rise buildings present several unique challenges not found in traditional low-rise buildings, such as safety of occupants, longer egress times and distance, evacuation strategies, emergency responder accessibility, smoke movement and fire control. High-rise buildings have garnered significant attention in the fire safety field over the years. The public, code bodies, local, regional and federal governments, as well as the design, build, and ownership communities are all affected by high-rise building safety. Conventionally, organizations such as NFPA continue to provide resources to help ensure occupant and property protection during the time of a fire in a high-rise building.

BRIEF DESCRIPTION

According to one embodiment, an integrated building evacuation system includes an evacuation controller; a fire alarm system in communication with the evacuation controller; an HVAC system in communication with the evacuation controller; a security system in communication with the evacuation controller; an elevator system in communication with the evacuation controller; and an output device in communication with the evacuation controller; the evacuation controller receiving data from the fire alarm system, the HVAC system, the security system and the elevator system to generate an evacuation path, during an evacuation event, for occupants of a building in response to the data from the fire alarm system, the HVAC system, the security system and the elevator system, the evacuation controller providing the evacuation path to the output devices In addition to one or more of the features described above, or as an alternative, further embodiments may include a building automation system in communication with the evacuation controller; the evacuation controller generating the evacuation path for occupants of the building in response to the data from the building automation system.

In addition to one or more of the features described above, or as an alternative, further embodiments may include a content server in communication with the evacuation controller; and audio/video sources in communication with the content server; the evacuation controller generating the evacuation path for occupants of the building in response to the data from the content server.

In addition to one or more of the features described above, or as an alternative, further embodiments may include wherein the content server provides the evacuation path to wireless devices.

In addition to one or more of the features described above, or as an alternative, further embodiments may include a command center in communication with the content server and the evacuation controller; the command center to provide evacuation information to the evacuation controller.

In addition to one or more of the features described above, or as an alternative, further embodiments may include a fire suppression system, the fire suppression system responding to commands from the evacuation controller during the evacuation event.

In addition to one or more of the features described above, or as an alternative, further embodiments may include wherein the evacuation controller provides commands to the HVAC system during the evacuation event to remove smoke from a portion of the building.

In addition to one or more of the features described above, or as an alternative, further embodiments may include wherein the evacuation controller provides commands to the HVAC system during the evacuation event to increase air pressure in a portion of the building.

In addition to one or more of the features described above, or as an alternative, further embodiments may include wherein the evacuation controller provides commands to the security system during an evacuation event to prevent access to a portion of the building.

In addition to one or more of the features described above, or as an alternative, further embodiments may include wherein the evacuation controller uses data from the security system and the content server to track occupants in the building.

In addition to one or more of the features described above, or as an alternative, further embodiments may include wherein the evacuation controller provides commands to the elevator system to allocate elevators for evacuation, control speed of elevators and control door times of elevators during an evacuation event.

In addition to one or more of the features described above, or as an alternative, further embodiments may include wherein the content server performs video based human fall detection from to identify fallen occupants.

In addition to one or more of the features described above, or as an alternative, further embodiments may include wherein the content server generates a notification of a fallen occupant to a first responder.

In addition to one or more of the features described above, or as an alternative, further embodiments may include wherein the evacuation controller monitors occupant location during the evacuation event, and generates an alternate evacuation path in response to occupant divergence from the evacuation path based on a current location of the occupant.

According to another embodiment, a method for controlling evacuation of a building includes receiving at an evacuation controller data from a fire alarm system; receiving at the evacuation controller data from an HVAC system; receiving at the evacuation controller data from a security system; receiving at the evacuation controller data from an elevator system; generating, by the evacuation controller, an evacuation path, during an evacuation event, for occupants of the building in response to the data from the fire alarm system, the HVAC system, the security system and the elevator system; and providing, by the evacuation controller, the evacuation path to an output device.

According to another embodiment, a computer program product, tangibly embodied on a non-transitory computer readable medium, for controlling evacuation of a building, the computer program product including instructions that, when executed by a processor, cause the processor to perform operations including: receiving data from a fire alarm system; receiving data from an HVAC system; receiving data from a security system; receiving data from an elevator system; generating an evacuation path, during an evacuation event, for occupants of the building in response to the data from the fire alarm system, the HVAC system, the security system and the elevator system; and providing the evacuation path to an output device.

According to another embodiment, an integrated building evacuation system comprising: an evacuation controller; a fire alarm system; an HVAC system; a security system; an elevator system; and an output device in communication with the evacuation controller; the evacuation controller receiving data from at least two of the fire alarm system, the HVAC system, the security system and the elevator system to generate an evacuation path, during an evacuation event, for occupants of a building in response to the data from the at least two of the fire alarm system, the HVAC system, the security system and the elevator system, the evacuation controller providing the evacuation path to the output device.

BRIEF DESCRIPTION OF THE DRAWINGS

FIG. 1 depicts a system for evacuation of buildings in an exemplary embodiment.

DESCRIPTION OF THE INVENTION

FIG. 1 depicts an integrated building evacuation system 100 for evacuation of, for example, tall buildings in an exemplary embodiment. The integrated building evacuation system 100 includes an evacuation controller 102 that interfaces with a number of other systems to coordinate evacuation of a building. The evacuation controller 102 may be implemented using a general-purpose microprocessor-based controller (e.g., a server) executing a computer program stored in a computer readable storage medium to execute the processes described herein. During an evacuation event, the evacuation controller 102 receives data from various sub-systems and provides commands to various sub-systems to enhance evacuation of a building.

Evacuation controller 102 interfaces with a fire alarm system 104, coupled to fire detection and alarm components 106. A fire suppression system 107 (e.g., sprinkler system) may be in communication with the fire detection and alarm components 106. Evacuation controller 102 interfaces with an HVAC system 108 to provide smoke control and/or localized pressurization. Evacuation controller 102 interfaces with a security system 110 that provides access control for the building. Evacuation controller 102 interfaces with a building automation system 112 and elevator system 114. The evacuation controller 102 uses data from the multiple intelligent systems to generate a dynamic evacuation path(s) and procedure(s). The evacuation controller 102 dynamically calculates evacuation path(s) for occupants to an elevator lobby, stairways, refuge area, designated escape chute systems, etc.

A content server 116 is in communication with the evacuation controller 102. The content server 116 may receive audio and/or video from audio/video sources 118 and process the audio/video to derive analytics. Audio/video output devices 120 (e.g., display screens, speakers, controllable signs) are coupled to the content server 116 and may be used to notify occupants of current conditions and evacuation plans/paths. The content server 116 may also communicate with wireless devices 122 to provide mobile alerts and evacuation plans/paths to occupants and responders. The content server 116 maintains a central data store for continuous streaming of data inputs coming from integrated building systems and processed data outputs coming from the evacuation controller 102 to allow for anytime or on-demand access, command and control, reporting, auditing and maintenance from a central location.

A command center 124 is in communication with the content server 116 and can retrieve audio/video content from the building to render decisions, support and control in evacuation plans. The command center 124 employs graphical interface(s) with enhanced capabilities to represent precise locations within the building where emergency events are taking place, to instantly zoom into situation at a specific location for on-screen control and real-time display from video cameras, elevator statistics, prioritization of events (e.g., color-coded) and real-time evacuation statistics (e.g., people count).

The evacuation controller 102 serves as the control program for intelligent and optimal dispatching of occupants and elevators during emergency evacuation. The system 100 uses the ability of integrated security system 110 and content server 116 to accurately track and record occupants present inside a building. Readers or people counter sensors installed at entrance doors or turnstiles of security access system 110 allow for occupancy monitoring through accurate calculation of the number of people present in a room, floor, elevator lobby or building at any given time. Intelligent video analytics provided by content server 116 determines queuing metrics, wait time determination, flow monitoring and wrong-way detection. In addition, system 100 accesses, in real-time, operational parameters from elevator system 114 such as occupancy load, travel speed, anticipated stops, assigned floors or zones, etc.

The evacuation controller 102 takes into consideration data coming from the fire alarm system 104, the security system 110 and the content server 116 to perform elevator mode override from normal operation mode to evacuation mode (e.g., out of service) and back into service upon completion of evacuation.

During an evacuation event, the evacuation controller 102 calculates evacuation path(s) for elevator car(s) to adapt to group passengers and stops, to serve a group of floors or a zone based on criticality of emergency condition(s) on a particular floor or zone, people count, traffic demand, elevator load etc., thereby resulting in faster, better organized service to evacuate building occupants. The evacuation controller 102, on a real-time basis, guides occupants along evacuation path(s) to the elevator lobby or stairways or refuge area based on anticipated walk time to exit and wait time for an elevator car as applicable to the mode of evacuation. The evacuation controller 102 also controls the speed and door operation of an elevator or bank of elevators in elevator system 114 to meet emergency and traffic demands. In a specific situation where an area has disabled occupants or wounded occupants, evacuation controller 102 uses video based human fall detection from content server 116 for identification of occupants in fall down incidents and sends prioritized notification to first responders and command center 124 with precise information of location and people count supported by live video using data coming from audio/video sources 118.

The integrated building evacuation system 100 provides live data feeds on alerts, evacuation paths, etc. The audio/visual output devices 120 may include public address systems, displays, lighted signs, etc. Content server 116 also provides such notifications to mobile devices 122. Additionally, the integrated building evacuation system 100 dynamically generates alternate evacuation paths based on occupant's position within a building. In a situation where occupants deviate from the recommended safe evacuation route, beacons working on wireless protocols (e.g., Bluetooth low energy or BLE) installed within the building transmit micro-locations to enable dynamic generation of evacuation path divergence and then generate alternate evacuation path(s) based on current location of an occupant.

The content server 116 maintains a continuous stream of data inputs coming from the audio/video sources and processed data outputs coming from the evacuation controller 102. The content server 116 allows for anytime or on-demand access, reporting, auditing and maintenance from command center 124.

After an emergency event, the integrated building evacuation system 100 provides for rapid restoration to normal operation. The evacuation controller 102 provides bi-directional control by issuing commands to the security system 110, audio/video output devices 120, HVAC system 108 and detection and alarm system 106, which may communicate with the fire suppression system 107. For example, in a situation where an area has to be cordoned due to emergency or threat within the specific area, the evacuation controller 102 issues commands to security system 110 for automatic lockout with possibility for manual override. The evacuation controller 102 communicates with HVAC system 108 to provide demand-controlled ventilation (DCV), pressurize egress paths and exhaust smoke or hazards to reduce hazardous content within building. The evacuation controller 102 communicates with the fire suppression system 107 (e.g., a high-pressure water mist sprinkler system) to cool surroundings, block radiant heat and reduce oxygen which feeds fire thereby enabling fast control and suppression of fire within the building.

The command center 124 enables building operators with a comprehensive and easy-to-use interface to monitor and control a wide array of elevator, escalator, and moving-walk functions. The command center 124 receives real-time operational information, and provides the ability to command and control evacuation procedure, as necessary, via communication with the evacuation controller 102. The elevator system 114 allows operators access to equipment status, performance, traffic patterns, floor accessibility, operating conditions, security status, events and alarms, etc. The command center 124 includes an interface to represent locations within the building where emergency events are taking place, to instantly zoom into situation at a specific location for on-screen control and real-time display from video cameras, to prioritize events (e.g., color-coded) and to provide real-time evacuation statistics (e.g., people count). The command center 124 allows operators the capability to manually override elevator modes or evacuation paths at any specific point in time during evacuation.

The integrated building evacuation system 100 provides integration with remote monitoring stations to monitor all alarms generated within the building. The integrated building evacuation system 100 provides integrated mobile and web-solutions, video, access, telephony, GPS tracking and reporting to allow for interfacing with first responders or external rescue services. To allow for redundancy, reliability and scalability, remote monitoring stations shall allow hosting outside building premises.

The integrated building evacuation system 100 dynamically generates alternate evacuation path(s) on a real-time basis in a situation where an occupant has deviated from a system recommended safe evacuation route. The evacuation controller 102, based on occupancy count and safe evacuation route(s), may issue commands to security system 110 for automatic lockout of zones outside of the generated evacuation paths, with the possibility for manual override of the lockout. This reduces risk and probability of occupants deviating from safe evacuation paths during panic conditions.

Benefits of the integrated building evacuation system 100 include reduced evacuation time(s), enhanced occupant safety and improved system reliability through intelligent and optimal evacuation strategy(s), live command and control, remote monitoring and rapid recovery methods.

As described above, the exemplary embodiments can be in the form of processor-implemented processes and devices for practicing those processes, such as evacuation controller 102. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings herein without departing from the essential scope thereof. Therefore, it is intended that the disclosure not be limited to the particular embodiments disclosed, but that the disclosure will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. An integrated building evacuation system comprising:
    an evacuation controller;
    a fire alarm system in communication with the evacuation controller;
    an HVAC system in communication with the evacuation controller;
    a security system in communication with the evacuation controller;
    an elevator system in communication with the evacuation controller;
    an output device in communication with the evacuation controller;
    the evacuation controller receiving data from the fire alarm system, the HVAC system, the security system and the elevator system to generate an evacuation path, during an evacuation event, for occupants of a building in response to the data from the fire alarm system, the HVAC system, the security system and the elevator system, the evacuation controller providing the evacuation path to the output device;

a content server in communication with the evacuation controller;
audio/video sources in communication with the content server;
the evacuation controller generating the evacuation path for occupants of the building in response to data from the content server;
wherein the content server performs video based human fall detection to identify fallen occupants.

2. The integrated building evacuation system of claim 1, further comprising:
a building automation system in communication with the evacuation controller;
the evacuation controller generating the evacuation path for occupants of the building in response to data from the building automation system.

3. The integrated building evacuation system of claim 1, wherein the content server provides the evacuation path to a wireless device.

4. The integrated building evacuation system of claim 1, further comprising:
a command center in communication with the content server and the evacuation controller;
the command center to provide evacuation information to the evacuation controller.

5. The integrated building evacuation system of claim 1, further comprising:
a fire suppression system, the fire suppression system responding to commands from the evacuation controller during the evacuation event.

6. The integrated building evacuation system of claim 1, wherein:
the evacuation controller provides commands to the HVAC system during the evacuation event to remove smoke from a portion of the building.

7. The integrated building evacuation system of claim 1, wherein:
the evacuation controller provides commands to the HVAC system during the evacuation event to increase air pressure in a portion of the building.

8. The integrated building evacuation system of claim 1, wherein:
the evacuation controller provides commands to the security system during the evacuation event to prevent access to a portion of the building.

9. The integrated building evacuation system of claim 1, wherein:
the evacuation controller uses data from the security system and the content server to track occupants in the building.

10. The integrated building evacuation system of claim 1, wherein:
the evacuation controller provides commands to the elevator system to allocate elevators for evacuation, control speed of elevators and control door times of elevators during an evacuation event.

11. The integrated building evacuation system of claim 1, wherein:
the content server generates a notification of a fallen occupant to a first responder.

12. The integrated building evacuation system of claim 1, wherein:
the evacuation controller monitors occupant location during the evacuation event, and generates an alternate evacuation path in response to occupant divergence from the evacuation path based on a current location of the occupant.

* * * * *